2,744,943

METHACRYLAMIDOACYLGUANAMINES

Leo S. Luskin and Peter L. de Benneville, Philadelphia, Pa., assignors to Rohm & Haas Company, Philadelphia, Pa., a corporation of Delaware No Drawing. Application August 18, 1954,
Serial No. 450,782

15 Claims. (Cl. 260—80.5)

This invention relates to methacrylamidoacylguanamines and to a method for their preparation. It also deals with polymers and copolymers therefrom.

The guanamines of this invention may be represented by the formula

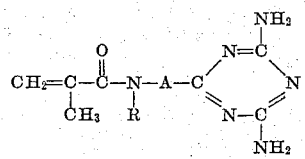

where R is hydrogen or an alkyl, alkenyl, aralkyl, or cycloalkyl group, and A is an alkylene group containing one to eight carbon atoms.

These compounds are useful in the fields of pesticides, corrosion inhibitors, and chemical intermediates. They can be reacted at the unsaturated linkage with compounds having a reactive hydrogen and yielding a carbanion. They can be reacted at the amino groups, as with formaldehyde. They can be polymerized. They can be copolymerized with other polymerizable ethylenic compounds, particularly with monovinylidene compounds. The latter are of interest in providing coating materials. The polymers and copolymers react with formaldehyde to form methylol compounds and ethers thereof which are of value in improving papers and in finishing textiles.

The above compounds are prepared by condensing methacrylamidonitriles with dicyandiamide in the presence of a strong base as catalyst and in the presence of an alcohol as solvent. As typical solvents there may be used methanol, ethanol, propanol, isopropyl alcohol or butanol, or methoxyethanol, ethoxyethanol, or a mixture of alcohols. The reaction is usually carried out at temperatures between 50° and 125° C. The reaction mixture may conveniently be heated under reflux.

As catalyst, there may be used an alkali metal hydroxide, a sodium alcoholate, a potassium alcoholate, or a low molecular weight quaternary ammonium hydroxide, such as potassium hydroxide, sodium hydroxide, potassium butoxide, potassium ethoxide, sodium ethoxide, sodium methoxide, choline, trimethylbenzylammonium hydroxide, dimethyldibenzylammonium hydroxide, trimethylbenzylammonium methoxide, trimethylbenzylammonium butoxide, etc. The usual amount of catalyst is from about 2% to 20% of the weight of the reactants.

The product is obtained as a residue which can be often purified by recrystallization or by trituration.

The starting methacrylamidoisobutyronitrile is known. It and its homologues are available, for example, through the method of Jacobson, wherein methacrylyl chloride is reacted with an aminonitrile, RNHACN.

A typical preparation is that of α-methacrylamidoisobutyronitrile. To a solution of 209 parts of methacrylyl chloride in 418 parts of benzene, there is added α-aminoisobutyronitrile in an amount of 336 parts dissolved in 672 parts of benzene, the mixture being stirred and cooled to keep the temperature below 45° C. The mixture is stirred for three hours. The solid product is filtered off and is washed with dilute aqueous potassium carbonate solution and with water. The washed product is recrystallized from 300 parts of hot water and dried. The product melts at 102°–104° C. Other illustrative preparations follow.

There are mixed 49 parts of β-aminopropiontrile and 36.6 parts of methacrylyl chloride. There is thus formed 41.9 parts of β-methacrylamidopropionitrile, melting at 46°–48° C.

In the same way, aminoisobutyronitrile and acrylyl chloride are reacted to give α-acrylamidoisobutyronitrile, melting at 103°–105° C.

A solution of 138 parts of N-cyclohexylaminoacetonitrile is dissolved in 138 parts of benzene and treated with 52 parts of methacrylyl chloride in an equal weight of benzene. There forms a solid amine hydrochloride, which is filtered off and washed with benzene. The benzene solutions are washed with dilute hydrochloric acid and water to remove amine, treated with charcoal, and evaporated to yield 93 parts of N-cyclohexylmethacrylamidoacetonitrile, melting at 74°–76° C.

In similar manner, 152 parts of N-cyclohexyl-β-aminopropionitrile and 52.3 parts of methacrylyl chloride are reacted to give 104 parts of N-cyclohexyl-β-methacrylamidopropionitrile, melting at 43°–44° C. Likewise, N-methyl-α-methacrylamidoisobutyronitrile is obtained as a colorless solid melting at 68°–71° C., while N-methyl-β-methacrylamidopropionitrile is obtained as a colorless liquid boiling at 102–104° C./0.2 mm.

In the same way N-benzyl or N-allyl methacrylamidopropionitriles or isobutyronitriles, or the like may be prepared.

Typical aminonitriles which are useful for forming the intermediate methacrylamidonitriles, as above, include N-methylaminoacetonitrile, N-butylaminoacetonitrile, N-benzylaminoacetonitrile, N-cyclohexylaminoacetonitrile, α-aminopropionitrile, α-methylaminopropionitrile, α-octylaminopropionitrile, α-benzylaminopropionitrile, α-cyclohexylaminopropionitrile, α-aminoisobutyronitrile, α-methylaminoisobutyronitrile, α-n-butylaminoisobutyronitrile, α-benzylaminoisobutyronitrile, α-octylaminoisobutyronitrile, α-dodecylaminoisobutyronitrile, α-cyclohexylaminoisobutyronitrile, α-allylaminoisobutyronitrile, α-methyl-α-aminobutyronitrile, α-methyl-α-methylaminobutyronitrile, α-methyl-α-benzylaminobutyronitrile, α-methyl-α-octylaminobutyronitrile, α-methyl-α-allylaminobutyronitrile, α-methyl-α-cyclohexylaminobutyronitrile, α-methyl-α-aminocapronitrile, α-methyl-α-methylaminocapronitrile, α-methyl-α-benzylaminocapronitrile, α-methyl-α-allylaminocapronitrile, α-methyl-α-aminocaprylonitrile, α-methyl-α-methylaminocaprylonitrile, α-methyl-α-octylaminocaprylonitrile, α-methyl-α-benzylaminocaprylonitrile, β-aminoisobutyronitrile, β-methylaminoisobutyronitrile, β-benzylaminoisobutyronitrile, β-allylaminoisobutyronitrile, β-dodecylaminoisobutyronitrile, β-cyclohexylaminoisobutyronitrile, β-aminobutyronitrile, β-methylaminobutyronitrile, β-octylaminopropionitrile, β-dodecylaminopropionitrile, etc. These aminonitriles are reacted with methacrylylchloride or bromide to form the methacrylamidonitriles which are then reacted with dicyandiamide.

In the following illustrative examples, there are shown typical procedures for forming the guanamines of this invention. Parts here, as above, are by weight.

Example 1

A mixture of 16.7 parts of α-methacrylamidoisobutyronitrile, 8.4 parts of dicyandiamide, and 80 parts of isopropyl alcohol is prepared and heated to 85° C. Thereto is slowly added a solution of 1.3 parts of 85% pure potassium hydroxide in 11.7 parts of isopropyl alcohol over a 30-minute period. The reaction mixture is heated under reflux for 10 hours. The reaction mixture is filtered. The filtrate is evaporated under reduced pressure to give a dry resin-like material. This is recrystallized from hot water to give 10.6 parts of a colorless solid which is identified as α-methacrylamidoisobutyroguanamine. This compound contains by analysis 35.3% of nitrogen (theory 35.6%) and melts at 160°–163° C. This compound is a particularly desirable one because it has good solubility in organic solvents due to the isobutylene group.

In the same way there is prepared from N-methyl-α-methacrylamidoisobutyronitrile and dicyandiamide the corresponding N-methyl - α - methacrylamidoisobutyroguanamine. As obtained this is a glassy solid which contains the theoretical amount of nitrogen. It, too, has good solvent solubility. The same method applied to N-benzyl-α-methacrylamidoisobutyronitrile yields the corresponding N-benzyl-α-methacrylamidoisobutyroguanamine, also as a glassy solid.

*Example 2*

There are mixed 97.2 parts of β-methacrylamidopropionitrile, 55.6 parts of dicyandiamide, 8.7 parts of potassium hydroxide, and 460 parts of isopropyl alcohol. The mixture is heated at reflux temperature for 12 hours. The reaction mixture is filtered and the filtrate is chilled. Crude product separates and is taken off, washed with methanol, and dried. The yield is 147 parts of β-methacrylamidopropioguanamine, melting at 184°–185° C. It contains by analysis 37.0% of nitrogen (theory 37.8%).

In the same way N-methyl-β-methacrylamidopropioguanamine is formed. It melts above 250° C. As obtained, this product is found to contain 35.4% of nitrogen (theory 35.6%).

*Example 3*

There are mixed 82.4 parts of N-cyclohexylmethacrylamidoacetonitrile, 33.6 parts of dicyandiamide, and 350 parts of isopropyl alcohol. Thereto is slowly added a solution of 5.3 parts of potassium hydroxide in 44.7 parts of isopropyl alcohol. The mixture is heated under reflux for eight hours and worked up as above.

There is obtained N-cyclohexylmethacrylamidoacetoguanamine in an amount of 94 parts. This is recrystallized from methanol to give a product melting at 273°–274° C. and containing 29.0% of nitrogen by analysis (theory 29.0%).

In the same way N-cyclohexylmethacrylamidopropionitrile is reacted with dicyandiamide to give N-cyclohexylmethacrylamidopropioguanamine, melting at 220°–221° C. and containing by analysis 27.5% of nitrogen (theory 27.6%).

There have also been reacted acrylamidoisobutyronitrile to give acrylamidoisobutyroguanamine of low purity as a yellow gum which was not readily purified. It was triturated with naphtha and dried in vacuum to a horny solid.

Similarly, crotonamidoisobutyroguanamine was formed, but as a somewhat impure product.

The methacrylamidoacylguanamines are polymerizable under the action of free radical initiators, such as the azo catalysts or orgnic peroxides. There may be used for this purpose such compounds as dimethyl or diethyl azodiisobutyrate, azodiisobutyronitrile, or azobis(α-methylbutyronitrile), or benzoyl peroxide, caproyl peroxide, or the like.

The said guanamines may be polymerized to give homopolymers or polymerized together with other monovinylidene compounds to give copolymers. The polymeric products can be reacted with formaldehyde to give valuable methylolated derivatives.

For example, five parts of α-methacrylamidoisobutyroguanamine and 25 parts of methyl alcohol are treated with benzoyl peroxide in increments to a total of 0.25 part while the solution is heated under reflux. The solution becomes distinctly viscous and polymer forms in a yield of over 95% if the polymerization is carried on for about 24 hours with occasional addition of catalyst. Somewhat better polymerization is effected with the azo initiators.

A mixture of five parts of N-methacryl-N-octylamidopropioguanamine, ten parts of dimethylformamide, and 0.2 part of dimethyl azodiisobutyrate is heated at 75° C. for 16 hours under nitrogen. A viscous solution of polymer results.

In the same way any of the methacrylamidoacylguanamines can be treated with a free radical catalyst with formation of polymers. Likewise, the methacrylamidoacylguanamines enter into copolymers with other polymerizable vinylidene compounds, particularly monovinylidene compounds. For this purpose, there may be used esters of acrylic acid, methacrylic acid, such as the methyl, ethyl, butyl, octyl, dodecyl, octadecyl, benzyl, cyclohexyl, methoxyethyl, dimethylaminoethyl, dimethylaminopropyl, morpholinopropyl, or piperidinopropyl esters or the like, acrylamide, methacrylamide, N-methylacrylamide, N-octylacrylamide, or other N-substituted acrylamides or their methacrylamide counterparts, acrylonitrile, methacrylonitrile, vinyl acetate, vinyl propionate, vinylpyridine, vinylpyrrole, ureidoethyl vinyl ether, etc.

In many cases but a small proportion of a methacrylamidoacylguanamine is used to supply groups which are reactive, as to formaldehyde, and which can, therefore, serve to cross-link the copolymer. Here 1% to perhaps 50% of such compound is ample for this use. Yet many useful copolymers can be made in which the methacrylamidoacylguanamine is the chief comonomer.

A solution is prepared from 95 parts of uninhibited methyl methacrylate, 11.8 parts of methacrylamidoisobutyroguanamine, and 2.1 parts of benzoyl peroxide in 131 parts of ethoxyethyl acetate. This solution is slowly added to a reaction vessel equipped with stirrer and a tube for admiting a stream of nitrogen and heated with an oil bath at 100° C. The mixture is heated for 4.5 hours. During this time, two additions of catalyst are made, each time 0.2 part of benzoyl peroxide in 15 parts of ethoxyethyl acetate being supplied. The amount of copolymer formed was determined from the non-volatile content. The product is a 36.2% solution of copolymer. The solution has a Gardner-Holdt viscosity of X+.

Some of this copolymer was treated with butyl hemiformal in butanol and applied as a coating on metal plates, 4% butyl acid phthalate being added to supply a catalyst. The solution was applied to a metal plate which was baked at 150° C. for 30 minutes. The film was hard, of good color, and resistant to solvents.

In the same way, there may be copolymerized 12 parts of methacrylamidoisobutyroguanamine, 25 parts methyl methacrylate and 20 parts of ethyl acrylate. The copolymer is formed in a 99% yield with use of 2.5% of benzoyl peroxide as catalyst over a 5.5 hour period. The films from this copolymer are tough and may be insolubilized as above by the action of formaldehyde.

There are mixed, with stirring, 0.9 part of N-methylmethacrylamidopropioguanamine and 95.5 parts of ethoxyethyl acetate. The mixture is heated to 80° C. while 47.5 parts of methyl methacrylate containing 1.5 parts of azodiisobutyronitrile is slowly added. Copolymerization is complete after about four hours. The product is not homogeneous, but there is nevertheless formed copolymer of the two starting materials.

For many purposes the methacrylamidoacylguanamines may be converted to salts by reacting with a strong inorganic acid, such as hydrochloric, hydrobromic, sulfuric, or phosphoric. Since there are two amino groups present in the methacrylamidoacylguanamines, salts may be formed with one such group or with both. The polymers and many copolymers may likewise be converted to salt forms. The salts are convenient for handling polymers in a water-soluble form.

For example, a portion of 2.3 grams of α-methacrylamidoisobutyroguanamine is taken up in 20 ml. of water with partial solution. Upon treatment with 20 ml. of 0.5 N hydrochloric acid solution complete solution is obtained. As this solution stands at low temperature, some hydrochloride of this guanamine precipitates. The salt is obtained quantitatively by evaporation under reduced pressure. It is dried at 75° C. at a pressure of 35 mm. to give a white solid which does not melt below 260° C. By analysis this dried salt contains 12.5% of chlorine. Theoretical chlorine for $C_{10}H_{17}N_6OCl$ is 13%.

In the same way, a portion of 2.36 grams of N-methylmethacrylamidopropioguanamine is slurried in water and treated with 20 ml. of 0.5 N hydrochloric acid solution to give a clear solution. When this solution is evaporated, a glassy solid is obtained. From its chlorine analysis it contains some dihydrochloride.

When about one part by weight of either of the above salts is taken up in three parts of water and the solution is heated to boiling and treated with about 0.01 part of ammonium persulfate, the salt dissolves and polymerization takes place. Small additions (about 0.001 g. each) are made at hourly intervals as the solution is kept at about 100° C. for six hours. There is formed a clear viscous solution of polymer in the form of its salt. Upon addition of dilute caustic soda solution to react with the hydrochloride, a white polymeric solid is formed which is soluble in hot but not in cold dimethylformamide.

A polymer is formed by mixing one part of α-methacrylamidoisobutyroguanamine, three parts of methanol, and 0.05 part of dimethyl azodiisobutyrate. The resulting solution is heated at about 75° C. for 16 hours. The solvent is evaporated to yield a white polymeric solid. This is insoluble in water, but upon titration with 0.1 N hydrochloric acid the salt of the polymer is formed. It is soluble in water. This solution can be used to apply the polymer to cellulosic fabric upon which the polymer is precipitated upon treatment with dilute alkali solutions. Reaction with formaldehyde followed by heating gives a permanently insoluble product on the fabric.

We claim:

1. A compound from the class consisting of chemical substances of the formula

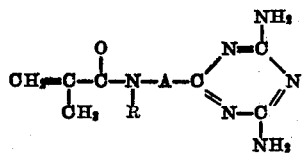

and salts thereof formed with strong inorganic acids, where R is a member of the class consisting of hydrogen and alkyl, alkenyl, aralkyl and cycloalkyl groups and A is an alkylene group containing one to eight carbon atoms.

2. A polymer of a compound of claim 1.
3. A copolymer of a compound of claim 1 and another polymerizable monovinylidene compound.

4. A compound of the formula

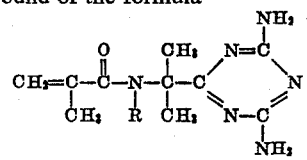

where R is an alkyl group of not over 12 carbon atoms.

5. A polymer of a compound of claim 4.
6. A copolymer of a compound of claim 4 and another polymerizable monovinylidene compound.
7. A compound of the formula

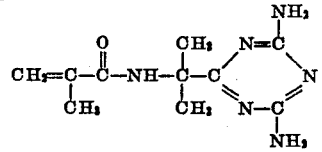

8. A polymer of the compound of claim 7.
9. A compound of the formula

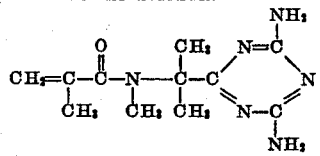

10. A polymer of the compound of claim 9.
11. A compound of the formula

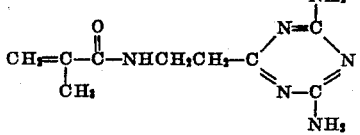

12. A compound of the formula

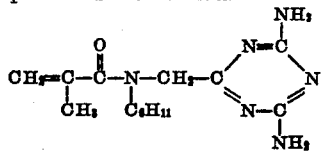

where $C_6H_{11}$ is the cyclohexyl group.

13. A compound of the formula

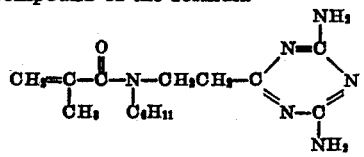

14. A copolymer of methacrylamidoisobutyroguanamine and methyl methacrylate.
15. A copolymer of methacrylamidoisobutyroguanamine, methyl methacrylate, and ethyl acrylate.

References Cited in the file of this patent

UNITED STATES PATENTS 2,459,397    Thurston _____ Jan. 18, 1949